US008732265B2

(12) United States Patent
Thomas et al.

(10) Patent No.: US 8,732,265 B2
(45) Date of Patent: May 20, 2014

(54) RECONCILIATION AND REMEDIATION WITH COMMUNICATION ARCHIVES

(75) Inventors: Shawn Thomas, Bangalore (IN); Gautam Pulla, Bangalore (IN); Yamin Wang, Bangalore (IN); Naveen Chand, Redmond, WA (US); Jeffrey Kay, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 12/147,668

(22) Filed: Jun. 27, 2008

(65) Prior Publication Data

US 2009/0327352 A1 Dec. 31, 2009

(51) Int. Cl.
G06F 15/16 (2006.01)

(52) U.S. Cl.
USPC .......................................................... 709/217

(58) Field of Classification Search
None
See application file for complete search history.

(56) References Cited

U.S. PATENT DOCUMENTS

| 5,813,009 | A | 9/1998 | Johnson et al. | |
|---|---|---|---|---|
| 6,240,414 | B1 * | 5/2001 | Beizer et al. ........................ | 1/1 |
| 6,889,247 | B2 | 5/2005 | Christie et al. | |
| 7,047,532 | B1 | 5/2006 | Connelly | |
| 7,096,223 | B2 | 8/2006 | Cope | |
| 7,117,246 | B2 | 10/2006 | Christenson et al. | |
| 7,289,974 | B2 | 10/2007 | Godeby et al. | |
| 7,568,008 | B2 * | 7/2009 | Jain et al. ...................... | 709/206 |
| 2002/0152309 | A1 * | 10/2002 | Gupta et al. .................. | 709/225 |
| 2003/0074356 | A1 | 4/2003 | Kaler et al. | |
| 2003/0093638 | A1 * | 5/2003 | Margerie et al. ............... | 711/162 |
| 2003/0152107 | A1 * | 8/2003 | Pekonen ....................... | 370/473 |
| 2004/0015505 | A1 | 1/2004 | Quick et al. | |
| 2005/0086384 | A1 | 4/2005 | Ernst | |
| 2005/0108435 | A1 | 5/2005 | Nowacki et al. | |
| 2005/0267938 | A1 | 12/2005 | Czeczulin | |
| 2005/0278390 | A1 * | 12/2005 | Kaler et al. .................... | 707/200 |
| 2006/0075032 | A1 | 4/2006 | Jain et al. | |
| 2006/0149788 | A1 * | 7/2006 | Bosloy et al. ................. | 707/201 |
| 2006/0227802 | A1 * | 10/2006 | Du et al. ........................ | 370/447 |
| 2006/0245755 | A1 * | 11/2006 | Gumaste et al. ................ | 398/59 |

(Continued)

FOREIGN PATENT DOCUMENTS

| JP | 2007226750 A | 9/2007 |
|---|---|---|
| KR | 1020040081289 A | 9/2004 |
| WO | 2006130259 A | 12/2006 |

OTHER PUBLICATIONS

"Configuring Email Reconciliation and PIM Synchronization", Blackberry, Mar. 2002, pp. 1-4.

(Continued)

*Primary Examiner* — Neveen Abel Jalil
*Assistant Examiner* — Kellye Buckingham
(74) *Attorney, Agent, or Firm* — Louise Bowman; David Andrews; Micky Minhas

(57) ABSTRACT

Techniques for reconciliation and remediation of messages sent by a server for storage in an archive are described. Some techniques may comprise receiving a message to be reconciled corresponding to a message sent by a server to be stored in an archive. The received message may be categorized for reconciliation, and a delivery confirmation query may be issued to the archive according to categorization of the message for reconciliation. Based on the response to the delivery confirmation query, it can be determined with certainty whether the message sent to the archive for storage is indeed stored at the archive. Other embodiments are described and claimed.

20 Claims, 7 Drawing Sheets

(56) References Cited

U.S. PATENT DOCUMENTS

| | | |
|---|---|---|
| 2007/0038714 A1* | 2/2007 | Sell .............................. 709/206 |
| 2007/0067403 A1* | 3/2007 | Holmes ......................... 709/206 |
| 2007/0072588 A1 | 3/2007 | Gorty et al. |
| 2007/0106771 A1 | 5/2007 | Lucash et al. |
| 2007/0156842 A1 | 7/2007 | Vermeulen et al. |
| 2007/0214218 A1* | 9/2007 | Ward et al. .................... 709/205 |
| 2008/0034315 A1 | 2/2008 | Langoulant et al. |
| 2009/0327352 A1* | 12/2009 | Thomas et al. ............... 707/200 |

OTHER PUBLICATIONS

MacCormick, et al., "Niobe: A Practical Replication Protocol", ACM Transactions on Storage, vol. 3, No. 4, Article 14, Feb. 2008, pp. 14.1-14.43.

Terry, et al., "The Case for Non-Transparent Replication: Examples from Bayou", In IEEE Data Engineering, 1998, pp. 1-10.

Gray, et al., "The Dangers of Replication and a Solution", Proceedings of the 1996 ACM SIGMOD international conference on Management of data, 1996, pp. 173-182.

International Search Report for PCT/US2009/045471, Mailed Jan. 13, 2010, 2 pages.

Office Action received for Russian Patent Application No. 2010153328, mailed Jun. 6, 2013, 6 pages.

Extended European Search Report Received for European Patent Application No. 09770642.8, mailed Jul. 25, 2013, 8 pages.

Klensin, J., "Request for Comments (RFC) 2821: Simple Mail Transfer Protocol", Network Working Group Request for Comments, vol. 2821, Apr. 1, 2001, 80 pages, XP003010059.

\* cited by examiner

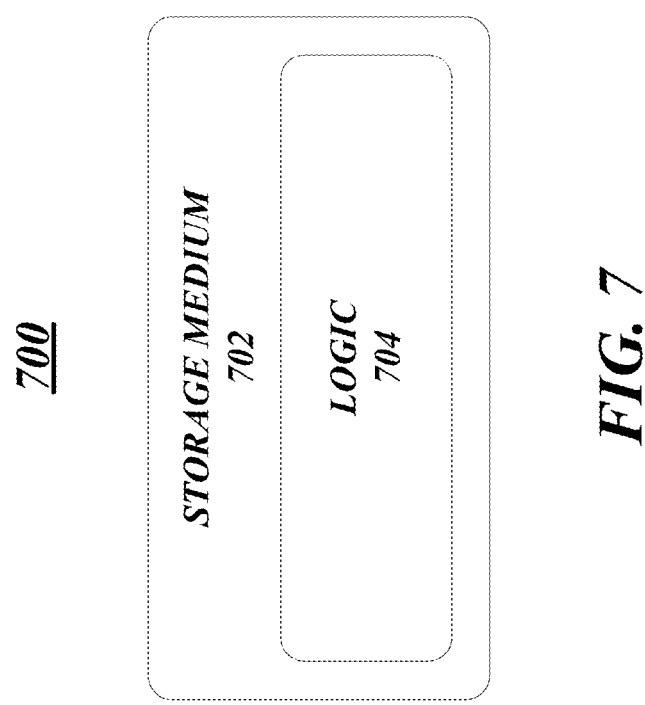

RECONCILIATION AND REMEDIATION WITH COMMUNICATION ARCHIVES

BACKGROUND

Electronic mail (e-mail) provides a store and forward approach for end-to-end message delivery that allows messages to travel across multiple machines, through various organizations and networks, and to survive temporary connection outages. The downside to this asynchronous approach is that the sending user or organization has no way of truly knowing if and when the recipient has received the message and whether any post-receipt processing has been successfully accomplished.

This problem is especially prevalent in the case of e-mail archives. Businesses and organizations that are subject to e-mail retention requirements due to regulatory compliance or court order need to be able to search and produce e-mails from such archives. Failure to do so can result in significant fines and reputation damage. Due to the inability for current e-mail systems to guarantee that a message sent to the archive has successfully been saved in the archive, these businesses incur significant cost having to search through redundant backups in addition to their archive.

From the perspective of the message generating e-mail system, there are several potential points of data loss along the way to the archive. For example, the generating e-mail system or an intermediary e-mail system may incur a software or hardware failure, and the message destined to the archive is lost. In addition, the front-end e-mail system of the archive where messages are received or the injection system of the archive where messages are saved into a database may incur a software or hardware failure, and the message destined to the archive is lost. Consequently, improvements are needed to solve these and other problems and for guaranteeing end-to-end delivery and archiving of a message in a transactionless environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are directed to techniques for reconciliation and remediation of messages sent by a server for storage in an archive. Some techniques may comprise receiving a message to be reconciled corresponding to a message sent by a server to an archive for storage, categorizing the received message for reconciliation, issuing a delivery confirmation query to the archive according to categorization of the message for reconciliation, and determining whether the message sent from the server to the archive is stored at the archive based on a response to the delivery confirmation query. A retry query may be issued after receiving a negative response to the delivery confirmation query. The message to be reconciled may be resubmitted to the archive after receiving a negative response to the retry query. The message to be reconciled may be stored until confirmation is received and deleted after receiving a positive response to the delivery confirmation query. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 7 illustrates an embodiment of an article.

DETAILED DESCRIPTION

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various techniques for reconciliation and remediation of messages sent by a server for storage in an archive are provided. Some techniques may comprise receiving a message to be reconciled corresponding to a message sent by the server to be stored in the archive. The received message may be categorized for reconciliation, and a delivery confirmation query may be issued to the archive according to categorization of the message for reconciliation. Based on the response to the delivery confirmation query, it can be determined with certainty whether the message sent to the archive for storage is indeed stored at the archive. Additionally or alternatively, a retry query may be issued after receiving a negative response to the delivery confirmation query. If a negative response to the retry query is received, the message to be reconciled may be resubmitted to the archive. The message to be reconciled may be stored until confirmation is received and deleted only after receiving a positive response to the delivery confirmation query to guarantee availability of the message.

Figure 1:
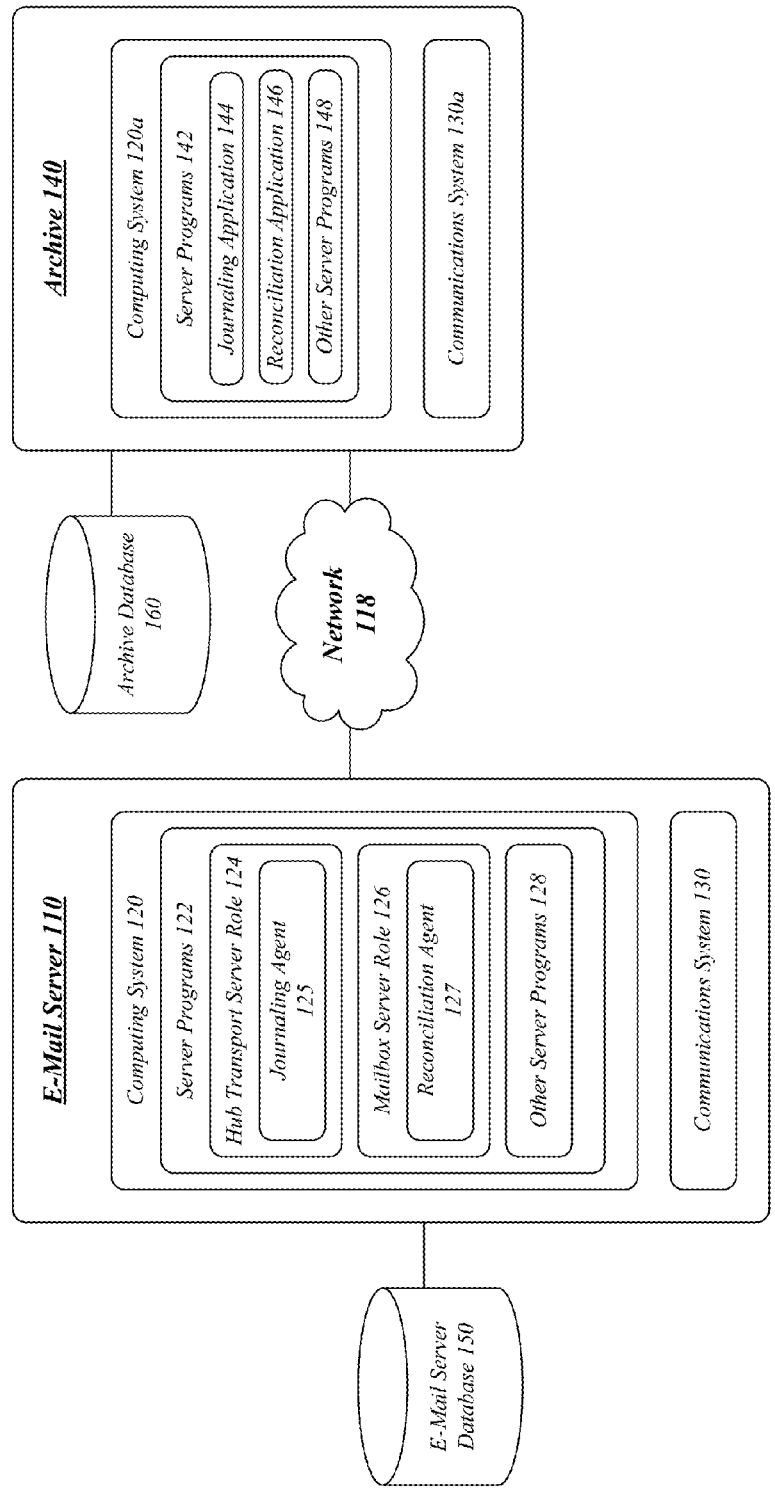
FIG. 1 illustrates an embodiment of an operating environment.

FIG. 1 illustrates a block diagram for an operating environment 100 suitable for practicing the various embodiments. The operating environment 100 may comprise elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the example illustrated in FIG. 1, the operating environment 100 may comprise, among other elements, an e-mail server 110 and an archive 140. Although the operating environment 100 as shown in FIG. 1 has a limited number of nodes in a certain topology, it may be appreciated that the operating environment 100 may include more or less nodes in alternate topologies as desired for a given implementation. In various embodiments, the e-mail server 110 may be implemented within an e-mail messaging system to send and receive messages over electronic communication systems. The archive 140 may be implemented as an on-site or off-site archiving system or data storage facility for archiving messages received over electronic communication systems from an e-mail messaging system. As shown, the e-mail server 110 and the archive 140 may be communicatively coupled via a network 118 and appropriate wireless or wired communications media. The e-mail server 110 and the archive 140 may communicate information over the network 118 and coordinate operations between each other, which may involve the unidirectional or bidirectional exchange of information. The network 118 may comprise a packet-switched network, a circuit-switched network, or a combination of both. The information communicated over the network 118 can be implemented as data messages sent across various network interfaces. Exemplary network interfaces include parallel interfaces, serial interfaces, and bus interfaces.

The e-mail server 110 may be operative to communicate with various types of messaging clients. In some implementations, the e-mail server 110 may provide an interface for communicating with a client-based software program such as MICROSOFT OFFICE OUTLOOK® application software from Microsoft Corporation, Redmond, Wash. The e-mail server 110 also may provide an interface for communicating with various other types of e-mail clients including, without limitation, Simple Mail Transfer Protocol (SMTP) clients, Hypertext Transfer Protocol (HTTP) clients, Messaging Application Programming Interface (MAPI) clients, Post Office Protocol 3 (POP3) clients, Internet Message Access Protocol (IMAP or IMAP4) clients, Network News Transfer Protocol (NNTP) clients, webmail clients, and so forth.

The e-mail server 110 may be operative to provide web access, mobile access, and synchronization functionality, Internet Information Services (IIS) and Internet Server Application Programming Interface (ISAPI) applications providing SMTP, NNTP, IMAP4, and POP3 services to allow communication over a variety of Internet access protocols and HTTP-based protocols including remote procedure call (RPC) over HTTP communication. In some implementations, the e-mail server 110 may communicate data formatted as compressed Wireless Binary XML (WbXML) data to make efficient use of bandwidth for mobile clients. In addition to standard Internet protocols, the e-mail server 110 also may support communication over proprietary or non-standard protocols when used by a company or other organization.

In various implementations, the e-mail server 110 and/or the archive 140 may perform one or more reconciliation and remediation techniques in accordance with the described embodiments. In some embodiments, the e-mail server 110 may comprise a server computing device implementing a server-based e-mail software program. Accordingly, in some embodiments, one or more reconciliation and remediation techniques may be implemented as features within a server-based software program such as MICROSOFT EXCHANGE SERVER® from Microsoft Corporation, Redmond, Wash. It can be appreciated that the embodiments are not limited in the context and that the e-mail server 110 may implement other types of applications, programs, or services including web-based e-mail applications providing access to e-mail services via a web browser.

In some embodiments, the archive 140 may comprise a server computing device implementing one or more server applications and/or web services. The archive 140 may implement various web services using platform and language independent formats designed to communicate over computer networks such as the Internet, using communications protocols such as Hypertext Transfer Protocol (HTTP), Hypertext Transfer Protocol over Secure Socket Layer (HTTPS), Simple Mail Transfer Protocol (SMTP), File Transfer Protocol (FTP), and so forth. Accordingly, in some embodiments, one or more reconciliation and remediation techniques may be implemented as features within server application and/or a web service. It can be appreciated that the embodiments are not limited in the context and that the archive 140 may be implemented by other types of on-site or off-site archiving systems and/or or data storage facilities.

In general, the e-mail server 110 and the archive 140 each may comprise or be implemented by any suitable type of computing device having computing capabilities and communications capabilities in accordance with the described embodiments. To implement such capabilities, the e-mail server 110 and the archive 140 may comprise respective computing systems 120, 120a and communications system 130, 130a. The computing systems 120, 120a may include various computing elements, such as one or more processors, co-processors, memory units, chipsets, controllers, peripherals, interfaces, oscillators, timing devices, video cards, audio cards, multimedia input/output (I/O) components, and so forth. The communications systems 130, 130a may include various communications elements, such as a transmitter, receiver, transceiver, radio, network interface, baseband processor, antenna, amplifiers, filters, and so forth.

The computing systems 120, 120a may implement, among other elements, respective server programs 122, 142. The server programs 122, 142 and their included elements may comprise or be implemented by one or more types of application programs, software components, program modules, and/or program data supporting operation of the e-mail server 110 and the archive 140 in accordance with the described embodiments. In some implementations, the server programs 122 may be implemented on one physical server computer device. Alternately, various server programs 122 may be implemented across multiple servers, potentially located in different domains and sites to meet geographical deployment requirements and/or to provide performance and fault tolerance when supporting a large number of users.

In the example illustrated in FIG. 1, the server programs 122 may implement one or more server roles including, for example, a hub transport server role 124 and a mailbox server role 126 operative to provide certain services and features for the e-mail server 110. The hub transport server role 124 may be operative to handle incoming and outgoing messages, and the mailbox server role 126 may be operative to host mailbox and public folder data. As shown, the hub transport server role 124 may comprise a journaling agent 125, and the mailbox server role 126 may comprise a reconciliation agent 127. According to various embodiments, the journaling agent 125 and the reconciliation agent 127 may perform one or more reconciliation and remediation techniques, as described in greater detail below. The server programs 122 also may comprise other server programs 128 such as other server roles and/or other types of server applications in accordance with the described embodiments.

In the example illustrated in FIG. 1, the server programs 142 may implement one or more server applications including, for example, a journaling application 144 and a reconciliation application 146 operative to provide certain services and features for the archive 140. According to various embodiments, the journaling application 146 and the reconciliation application 146 may communicate with the journaling agent 125 and the reconciliation agent 127 for performing one or more reconciliation and remediation techniques, as described in greater detail below. The server programs 142 also may comprise other server programs 148 such as other types of server applications and/or web services, in accordance with the described embodiments.

The e-mail server 110 and the archive 140 may comprise or communicate with respective data stores for storing items such as e-mail messages and other data in mailboxes and folders in accordance with the described embodiments. With reference to FIG. 1, a data store for the e-mail server 110 may implemented by an e-mail server database 150, and a data store for the archive 140 may be implemented by an archive database 160. While shown as being separate elements for purposes of illustration, it can be appreciated that, in some embodiments, the e-mail server database 150 may form part of the e-mail server 110 and/or the archive database 160 may form part of the archive 140. It also can be appreciated that the respective data stores for the e-mail server 110 and the archive 140 can reside with the e-mail server 110 and the archive 140 or in other remote devices.

Figure 2:
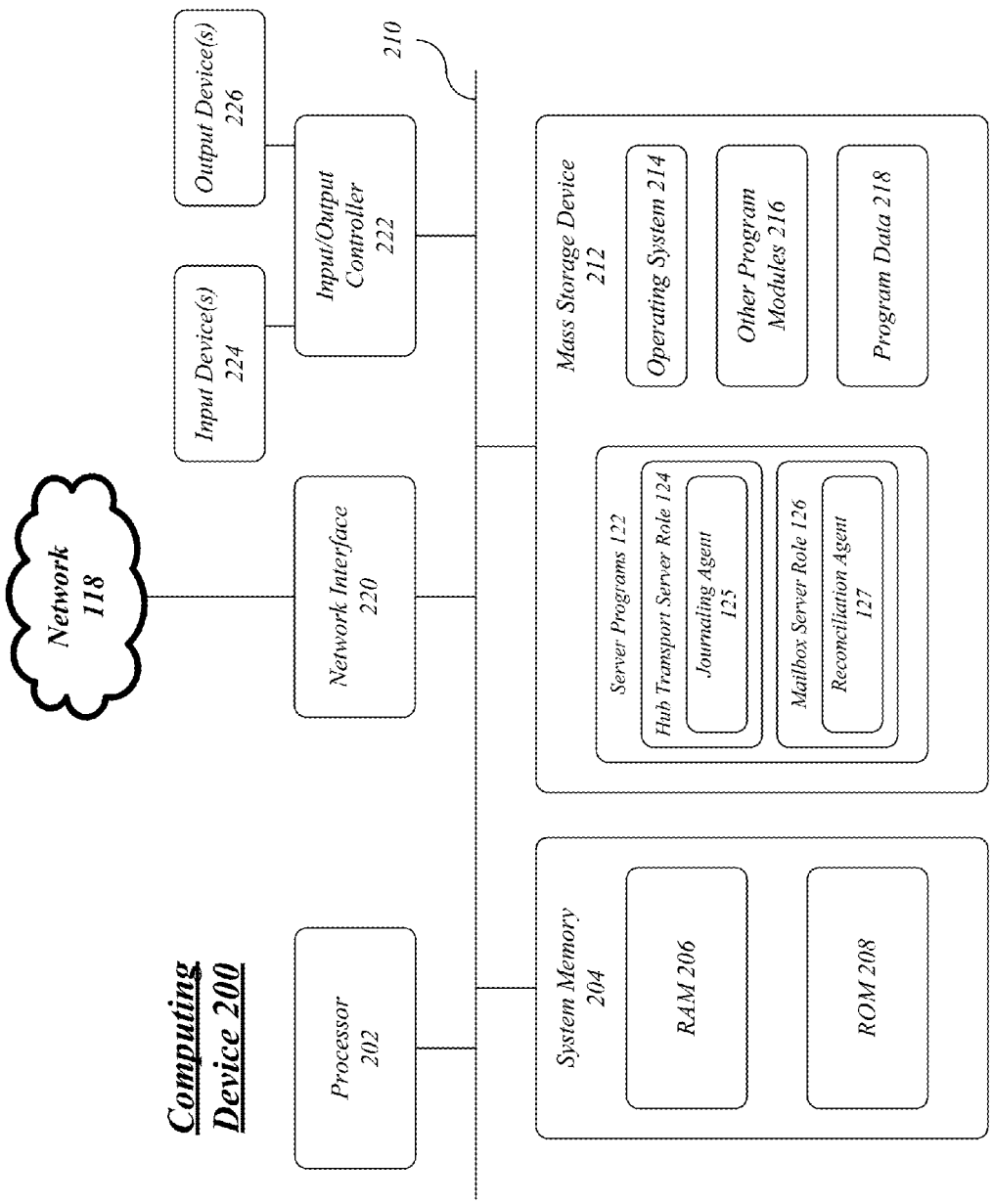
FIG. 2 illustrates an embodiment of a computing device.

FIG. 2 provides an illustrative architecture for a computing device 200 suitable for practicing the various embodiments. The computing device 200 may be representative of, for example, the e-mail server 110. As shown, the computing device 200 illustrates a conventional computing architecture for a personal or server computer, including a processing system comprising a processor 202 and a system memory 204. The system memory 204 may include, among other types of memory, a random access memory (RAM) 206 and a read-only memory (ROM) 208. An input/output (I/O) system, such as a basic I/O system (BIOS), may implement routines to assist in transferring information between elements within the computing device 200, such as during startup operations, using logic stored in the ROM 208. A system bus 210 communicatively couples all of the elements of the computing device 200 to facilitate information transfer and data processing operations.

The computing device 200 further includes a mass storage device 212 for storing an operating system 214 such as a MICROSOFT WINDOWS® operating system from Microsoft Corporation, Redmond, Wash. or other suitable operating system. The mass storage device 212 also may store various application programs, as described in greater detail below, as well as other program modules 216 and program data 218.

The mass storage device 212 is connected to the processor 202 through a mass storage controller (not shown) connected to the system bus 210. The mass storage device 212, and its associated computer-readable media, provides non-volatile storage for the computing device 200. Although the description of computer-readable media contained herein refers to a mass storage device, such as a hard disk or CD-ROM drive, it is to be appreciated by those skilled in the art that computer-readable media can be any available media that can be accessed by the computing device 200. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments, the computing device 200 may operate in a networked environment using logical connections to remote computers through a network 118 which, in some implementations, may be a Transmission Control Protocol (TCP) and Internet Protocol (IP) network, such as the Internet. The computing device 200 may connect to the network 118 through a network interface 220 (e.g., a wired or wireless network interface) connected to the system bus 210. It can be appreciated that the network 118 may comprise any type of network in accordance with the described embodiments including, without limitation, a wide area network (WAN), a local area network (LAN), and/or a cellular telephone network and that the network interface 220 may support various transport layers such as GPRS, CDMA 1xRTT, IEEE 802.11, Bluetooth® (PAN) and others for connecting to a variety of networks and/or remote computer systems.

The computing device 200 may include an I/O controller 222 for receiving and processing input from a number of input devices 224. A user may enter commands and information into the computing device 200 through various input devices 224 such as a keyboard and pointing device, such as a mouse, trackball or touch pad. Other examples of input devices 224 may include a microphone, joystick, game pad, satellite dish, scanner, or the like. The input devices 224 may be connected to the processor 202 through the I/O controller 222 that is coupled to the system bus 210, but may be connected by other interfaces and bus structures, such as a parallel port, game port or a universal serial bus (USB). The I/O controller 222 also may provide output to various output devices 224, such as a monitor or other type of display device that is connected via the I/O controller 222 to the system bus 210, a printer, speakers, and other peripheral devices.

As mentioned above, a number of program modules and data files may be stored in the mass storage device 212 and RAM 206 of the computing device 200. In the example illustrated in FIG. 2, the mass storage device 212 and RAM 206 may store the operating system 214 as well as one or more server programs 122 including the hub transport server role 124 comprising the journaling agent 125 and the mailbox server role 126 comprising the reconciliation agent 127. According to various embodiments, the reconciliation agent 127 may be operative to perform one or more reconciliation and remediation techniques. In one embodiment, for example, the reconciliation agent 127 may be implemented as described with reference to FIG. 3.

Figure 3:
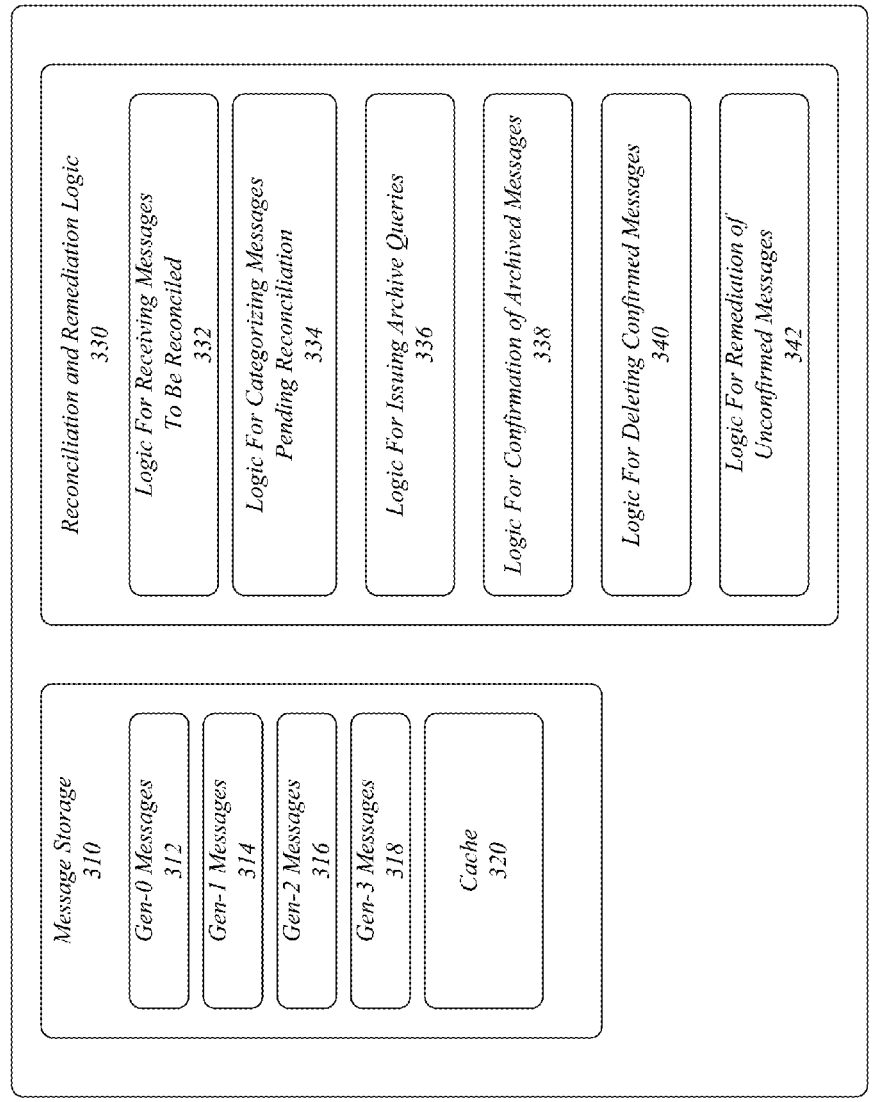
FIG. 3 illustrates an embodiment of a reconciliation application.

FIG. 3 illustrates one embodiment of reconciliation application 300 suitable for practicing the various embodiments. With reference to FIGS. 1 and 2, in some implementations, the reconciliation application 300 may operate as the reconciliation agent 127 as one of the server programs 122 that reside on the e-mail server 110. One or more parts of the e-mail application 300 also may be implemented by application programs in the RAM 206 of the computing device 200 or in any other variation as would occur to one in the computer software art.

As shown, the e-mail application 300 may include message storage 310. While the message storage 310 is shown as part of the reconciliation application 300 for purposes of illustration, and not limitation, it can be appreciated that the message storage 310 can reside in various locations in accordance with the described embodiments. For instance, the message storage 310 may reside on the e-mail server 110 and/or the e-mail server database 150. As one non-limiting example, the message storage 310 of the reconciliation application 300 can reside within the program data 218 of the computing device 200, either in a database and/or in one or more files. As another non-limiting example, the message storage 310 can reside all or in part in a directory specified by the user in the file system of an operating system such as the operating system 214.

In the example illustrated in FIG. 3, the message storage 310 includes one or more messages pending reconciliation which may be categorized as Generation 0 (Gen-0) messages 312, Generation 1 (Gen-1) messages 314, Generation 2 (Gen-2) messages 316, and Generation 3 (Gen-3) messages 318. In various embodiments, queries may be issued according to message categorization. For example, queries may be issued based on the reconciliation generations to optimize the performance of the reconciliation process and to minimize the number of queries to the archive 140.

In some embodiments, messages pending reconciliation may be categorized as Gen-0 messages 312 based on latency associated with the archive 140. Messages received by the reconciliation application 300 and categorized as Gen-0 messages 312 may correspond to messages which were recently sent to the archive 140. According to various embodiments, queries are not issued for pending Gen-0 messages 312 and delayed until the latency associated with the archive 140 has elapsed.

For a short interval of time after a particular message is received by the reconciliation application 300, a copy of the particular message may be locally stored in and accessed from a cache 320. In some embodiments, messages pending reconciliation may be categorized as Gen-1 messages 314 based on the time interval when a copy of the particular message may be locally available from the cache 320. Messages received by the reconciliation application 300 and categorized as Gen-1 messages 314 may correspond to messages which are expected to have been delivered to and/or processed by the archive 140. In addition, while the copy of the message is available from the cache 320, I/O savings may be realized. In various implementations, delivery confirmation queries are sent for Gen-1 messages 314 and an attempt is made to process almost all messages during the lifetime of cache 320.

When a positive response to a delivery confirmation query is received for a particular message, the reconciliation application 300 confirms that the message is archived and may delete the message from the message storage 310. When the reconciliation application 300 receives a negative response regarding a particular message, the unconfirmed message is maintained in the message storage 310 to guarantee its availability until it can be confirmed that the message is archived.

In some embodiments, messages pending reconciliation may be categorized based on the failure to confirm the archiving of such messages. When negative responses for particular messages are received, the reconciliation application 300 may categorize the messages as Gen-2 messages 316. Messages may remain categorized as Gen-2 messages 316 based on the time needed to resolve message delays. Pending messages categorized as Gen-2 messages 316 by the reconciliation application 300 may correspond to unconfirmed messages experiencing delay issues. According to various embodiments, queries are not issued for Gen-2 messages 316 and delayed to allow mail delays to be resolved.

Pending messages categorized as Gen-3 messages 318 by the reconciliation application 300 may correspond to unconfirmed messages that had delay issues that now may be resolved. The reconciliation application 300 may issue retry queries for one or more of the Gen-3 messages 218. When a positive response is received for a particular message, the reconciliation application 300 can confirm that the previously unconfirmed message has been archived and may delete the message from the message storage 310. When a negative response for the retry query is received, the unconfirmed message remains in the message storage 310 to guarantee its availability until it can be confirmed that the message is archived.

When one or more Gen-3 messages 218 cannot be confirmed, the reconciliation agent 127 may perform remediation by resubmitting the Gen-3 messages 318 to the archive 140. Until it is confirmed that a particular message is archived, the unconfirmed message remains in the message storage 310 to guarantee its availability. The reconciliation application 300 may resubmit the unconfirmed Gen-3 messages 318 to the archive 140 and may keep a copy of each unconfirmed message in the message storage 310. After a particular unconfirmed message is resubmitted to the archive 140, the reconciliation process may begin again until it is confirmed that the particular message is archived. It can be appreciated that even when a particular message cannot be reconciled, the message remains in the message storage 310 to guarantee its availability.

As shown, the e-mail application 300 may include reconciliation and remediation logic 330 which may be responsible for carrying out some or all of the reconciliation and remediation techniques described herein. In the example illustrated in FIG. 3, the reconciliation and remediation logic 330 includes logic for receiving messages to be reconciled 332, logic for categorizing messages pending reconciliation 334, logic for issuing archive queries 336, logic for confirmation of archived messages 338, logic for deleting confirmed messages 340, and logic for remediation of unconfirmed messages 342.

In some implementations, the reconciliation and remediation logic 330 may reside within the reconciliation application 300 as part of the reconciliation agent 127 on the e-mail server 110. It can be appreciated, however, that the reconciliation and remediation logic 330 can alternatively or additionally be embodied as computer-executable instructions stored on one or more types of computer-readable storage media in a variety of locations in accordance with the described embodiments.

Although the example illustrated in FIG. 3 includes a particular set of logic, it can be appreciated that the reconciliation and remediation logic 330 provides an exemplary implementation of the general functionality. It is to be understood that the sequence of logic does not necessarily have to be executed in the order presented unless otherwise indicated. In addition, while the reconciliation and remediation logic 330 may be described as performing a certain sequence of steps, other sequences of steps may also be performed according to alternative embodiments. Moreover, some individual steps performed by the reconciliation and remediation logic 330 may include multiple sub-steps that may be performed in various sequences as appropriate to the individual step. Furthermore, additional steps may be performed or some steps may be omitted by the reconciliation and remediation logic 330 depending on the particular implementation.

Figure 4:
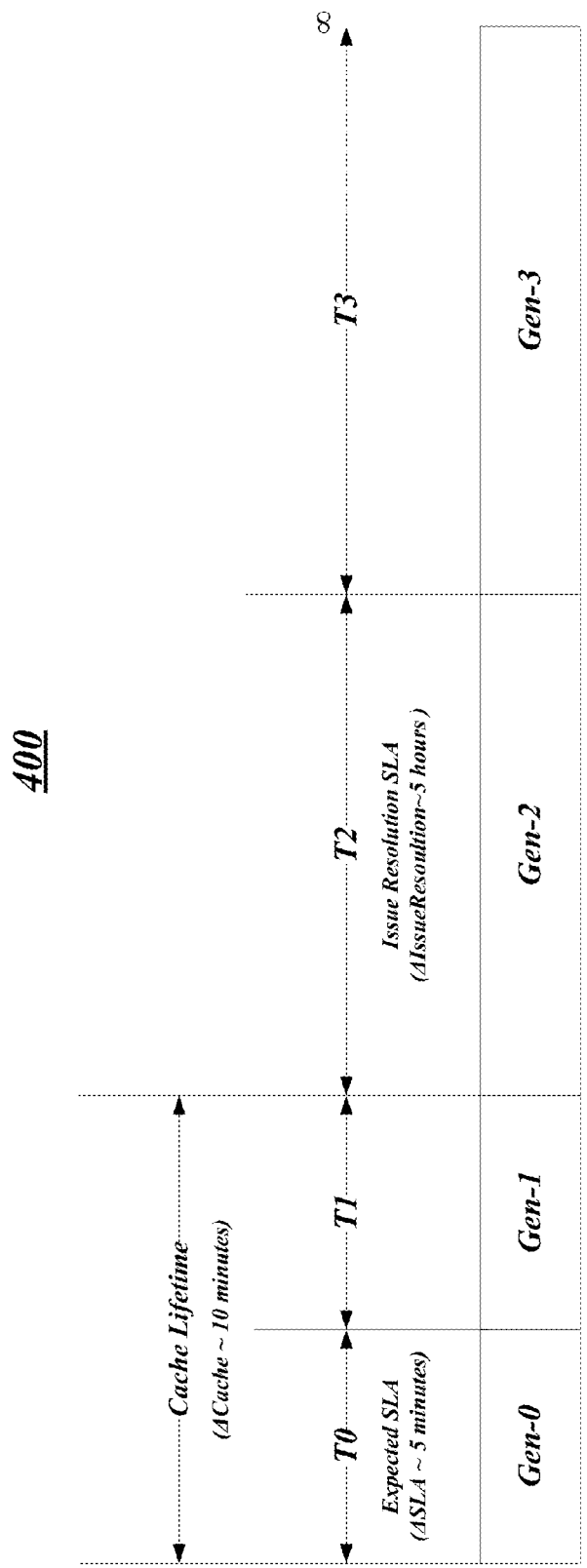
FIG. 4 illustrates an embodiment of a diagram.

FIG. 4 illustrates one embodiment of a diagram 400 showing reconciliation generations suitable for practicing the various embodiments. Referring to FIGS. 1-3, in some implementations, messages that are pending reconciliation may be categorized into the reconciliation generations by the reconciliation application 300 which, in turn, may be implemented by the reconciliation agent 127 residing on the e-mail server 110. The embodiments, however, are not limited to such implementations. Further, it can be appreciated that the terms categorize or generation (and their derivatives) may refer to any suitable technique or group of messages in accordance with the described embodiments. While some operating systems or applications may not use the terms categorize or generation when referring to the classification of messages or a group of messages, such scenarios are intended to be covered by the described embodiments.

As shown, messages pending reconciliation may be categorized as Generation 0 (Gen-0), Generation 1 (Gen-1), Generation 2 (Gen-2), and Generation 3 (Gen-3) messages according to corresponding time intervals (T0-T3). In this example, a message may be classified as a Gen-0 message when a time associated with the message is within a time interval T0, a Gen-1 message when the time is within time interval T1, a Gen-2 message when the time is within time interval T2, and a Gen-3 message when the time is during T3. While some embodiments may describe certain exemplary values associated with the time intervals (T0-T3), it is to be understood that other suitable values may be used. It also can be appreciated that messages may be categorized in other ways in accordance with the described embodiments.

In various implementations, the time associated with a particular message may correspond to the amount of time that has elapsed since the copy of the journal report including the particular message was received. For example, the time associated with a particular message may be when the copy of the journal report containing the particular message is received by the reconciliation agent 127 and/or when the particular message is stored in the message storage 310. In other embodiments, the time associated with the message may be based on the time when the message was sent to the archive 140 which may be provided in the copy of the journal report.

After a particular message is received by the reconciliation agent 127 in a copy of a journal report, a short interval of time may be needed for the original journal report to be delivered to and/or processed by the archive 140. Accordingly, in some embodiments, messages pending reconciliation may be categorized based on latency such as delivery and/or processing latency associated with the archive 140.

In the example illustrated in FIG. 4, a message may be categorized as a Gen-0 message when the time associated with the message is within the time interval T0. As shown, the length of the time interval T0 may correspond to an expected level agreement (SLA) or latency ($\Delta$SLA) for an original journal report to be delivered to the archive 140. Generally, the time interval $\Delta$SLA will be a relatively short period of time, such as approximately 5 minutes.

According to various embodiments, the time interval $\Delta$SLA may be based on delivery and/or processing latency for messages sent to the archive 140. In some embodiments, the time interval $\Delta$SLA may be an assumed or observed amount of time taken for most journal reports to be delivered to the archive 140. The time interval $\Delta$SLA also may be defined by a vendor SLA that specifies the level of service and/or time for performance contracted to by the archive 140. In some cases, the time interval $\Delta$SLA may be based on information provided by the archive 140. For example, in some implementations, the reconciliation agent 127 may query the archive 140 to obtain certain configuration information such as the expected SLA or latency for processing messages.

As shown, the time interval T0 may correspond to and end after $\Delta$SLA has elapsed. In various implementations, a particular message may be categorized as a Gen-0 message during the time interval T0 and until $\Delta$SLA has elapsed from the time associated with the message, such as when the copy of the journal report containing the particular message was received by the reconciliation agent 127 and/or when the message was stored in the message storage 310. Accordingly, messages received by the reconciliation agent 127 and categorized as Gen-0 may correspond to messages which were recently sent to the archive 140.

For a short interval of time after a particular message is received by the reconciliation agent 127, a copy of the message to be reconciled may be locally stored in and accessed from the cache 320. Accordingly, in some embodiments, messages pending reconciliation may be categorized based on this time interval or cache lifetime ($\Delta$Cache) associated with the cache 320. In general, the cache lifetime $\Delta$Cache will be, and in some cases is required to be, longer that the expected latency $\Delta$SLA. In some embodiments, the cache lifetime $\Delta$Cache may be approximately 10 minutes.

The cache lifetime $\Delta$Cache generally will vary in direct-proportion to the available RAM on the system, such as RAM 206. For example, on the e-mail server 110 with a cache lifetime $\Delta$Cache of 10 minutes, the cache lifetime $\Delta$Cache usually can be doubled by doubling the RAM. Accordingly, the $\Delta$Cache time interval typically is much more variable than most of the other time intervals, such as the time interval $\Delta$SLA, which tends to be around 5 minutes and is relatively hard to change. Due to its linear relationship with the RAM, the cache lifetime $\Delta$Cache can be easily increased by adding RAM on the server(s) running the reconciliation agent 127.

This allows the cache lifetime ΔCache to comfortably exceed the SLA time interval when required and to produce I/O savings.

In the example illustrated in FIG. 4, a message may be classified as a Gen-1 message when the time associated with the message is within the time interval T1. As shown, the length of the time interval T1 may correspond to the time window after the expiration of ΔSLA and before the expiration of the cache lifetime ΔCache. In various implementations, a particular message may be categorized as a Gen-1 message during the time interval T1 and until the cache lifetime ΔCache has elapsed from the time associated with the message, such as when the copy of the journal report containing the particular message was received by the reconciliation agent 127 and/or when the message was stored in the message storage 310. Accordingly, messages received by the reconciliation agent 127 and categorized as Gen-1 may correspond to messages which are expected to have been delivered to and/or processed by the archive 140.

In various embodiments, queries may be issued according to message categorization. For example, queries may be issued based on the reconciliation generations to optimize the performance of the reconciliation process and to minimize the number of queries to the archive 140.

Messages received by the reconciliation agent 127 and categorized as Gen-0 may correspond to messages which were recently sent to the archive 140. According to various embodiments, queries are not issued by the reconciliation agent 127 for pending messages categorized as Gen-0. For example, if a query were sent to the archive 140 regarding the disposition of a journal report before ΔSLA has elapsed, the query would probably result in a negative response (Nak). Accordingly, the issuing of queries is not performed for Gen-0 messages during T0 and may be delayed until the expiration of ΔSLA.

Messages received by the reconciliation agent 127 and categorized as Gen-1 correspond to messages expected to be stored in the archive 140. In addition, while the copy of the message is available from the cache 320, I/O savings may be realized. After the expiration of the cache lifetime (ΔCache), however, the copy of the message may fall out of the cache 320, and I/O savings are no longer possible. In various embodiments, initial queries are sent for pending messages categorized as Gen-1. In such embodiments, the reconciliation agent 127 may attempt to process almost all messages during the time interval T1, which may be based on and extend to the expiration of the cache lifetime ΔCache. Accordingly, the performance of the reconciliation process may be optimized since the reconciliation agent 127 issues queries for messages expected to be stored in the archive 140 and may realize I/O savings by accessing messages from the cache 320.

During the time interval T1, the reconciliation agent 127 may contact the reconciliation application 146 of the archive 140 and issue an initial query comprising the message IDs for one or more Gen-1 messages. The initial query may be received by the archive 140 via the reconciliation application 146, and a determination may be made whether each of the messages identified in the query has been received and is fully stored by the archive 140. After determining that all of the messages indentified in the query are fully stored, the archive 140 may respond via the reconciliation application 146 with a positive response (Ack) indicating that each message is stored. When a positive response is received for a particular message, the reconciliation agent 127 confirms that the message is archived and may delete the message from the local message store 310.

In some cases, however, it may be determined that one or more of the messages indentified in the query are not be stored by the archive 140. For example, the archive 140 may not have received a particular message at the time the query is received. In such cases, the archive 140 may respond via the reconciliation application 146 with a negative response (Nak) identifying the messages that are not stored. Because the initial delivery confirmation queries issued by the reconciliation agent 127 are for messages expected to be stored in the archive 140, the receipt of a negative response may be indicative of typical message delivery and processing delays or more serious problems. When the reconciliation agent 127 receives a negative response from the archive 140 regarding a particular message, the unconfirmed message is maintained in the message storage 310 to guarantee its availability until it can be confirmed that the message is archived.

When a negative response for a particular message is received, the reconciliation agent 127 may categorize the message as Gen-2. Accordingly, in some embodiments, messages pending reconciliation may be categorized based on the failure to confirm the archiving of such messages. If the archiving of a message cannot be confirmed, it may be the case that typical message delivery and processing delays are being experienced and that additional time is needed to allow the delay to be resolved.

In the example illustrated in FIG. 4, a message may be categorized as a Gen-2 message when the time associated with the message is within the time interval T2. As shown, the length of the time interval T2 may correspond to an issue resolution SLA (ΔIssueResolution) time interval. According to various embodiments, the time interval ΔIssueResolution may be based on the time needed to resolve message delays. For example, the time interval ΔIssueResolution may be an assumed or observed amount of time taken for most message delay issues to be resolved in normal course, through automated correction, and/or by manual intervention to fix the issue causing the delay. Generally, the time interval ΔIssueResolution will be a relatively longer period of time, such as approximately 5 hours.

Messages pending reconciliation may be categorized based on a time interval for resolving message delays. It can be appreciated that, ideally, the categorization of a message as Gen-2 or Gen-3 is a rare occurrence. In various implementations, a particular message may be categorized as a Gen-2 message during the time interval T2 and until the time interval ΔIssueResolution has elapsed and then categorized as Gen-3. For example, a particular unconfirmed message may be categorized as Gen-2 until a time interval of (ΔCache+ΔIssueResolution) has elapsed from the time when the copy of the journal report containing the particular unconfirmed message was received by the reconciliation agent 127 and/or when the unconfirmed message was initially stored in the message storage 310. Alternatively, a particular unconfirmed message may be categorized as Gen-2 until the time interval ΔIssueResolution has elapsed from the time when the initial delivery confirmation query for the particular unconfirmed message was sent.

Pending messages categorized as Gen-2 by the reconciliation agent 127 may correspond to unconfirmed messages experiencing delay issues. According to various embodiments, queries are not issued by the reconciliation agent 127 for pending messages categorized as Gen-2. For example, if a retry query were sent regarding the disposition of a journal report before ΔIssueResolution has elapsed, the query would probably result in another negative response (Nak). Accordingly, the issuing of queries is not performed for Gen-2 messages during T2 and may be delayed until the expiration of ΔIssueResolution.

In various embodiments, messages categorized as Gen-3 messages may comprise messages older than T0+T1+T2. In some embodiments, for example, messages categorized as Gen-3 span all messages submitted before a time interval (ΔCache+ΔIssueResolution) before the current time. Pending messages categorized as Gen-3 by the reconciliation agent 127 may correspond to unconfirmed messages that had delay issues that now may be resolved.

After allowing the time interval ΔIssueResolution to elapse for mail delays to be resolved, the reconciliation agent 127 may issue a retry query for one or more unconfirmed messages categorized as Gen-3. During the time interval T3, for example, the reconciliation agent 127 may contact the reconciliation application 146 of the archive 140 and issue a retry query comprising the message IDs for one or more Gen-3 messages. In some embodiments, the reconciliation agent 127 may periodically issue a retry query for some or all of the pending Gen-3 messages. For example, the reconciliation agent 127 may contact the reconciliation application 146 of the archive 140 every 24 hours and issue a retry query comprising all message IDs for all Gen-3 messages previously submitted before a time interval (ΔCache+ΔIssueResolution) before the current time.

The retry query may be received by the archive 140 via the reconciliation application 146, and a determination may be made whether each of the messages identified in the retry query has now been received and is fully stored by the archive 140. If it is determined that all of the Gen-3 messages indentified in the retry query are fully stored, the archive 140 may respond via the reconciliation application 146 with a positive response (Ack) indicating that each message is stored. When a positive response is received for a particular message, the reconciliation agent 127 can confirm that the previously unconfirmed message has been archived and may delete the message from the local message store 310.

If, however, it is determined that one or more of the messages indentified in the retry query are not be stored, the archive 140 may respond via the reconciliation application 146 with a negative response (Nak) identifying the messages that are not stored. When the reconciliation agent 127 receives a negative response from the archive 140 regarding a particular message, the unconfirmed message remains in the message storage 310 to guarantee its availability until it can be confirmed that the message is archived.

In some embodiments, when a negative response for a retry query is received for a Gen-3 message, the reconciliation agent 127 may determine whether a maximum latency threshold has been reached. If the maximum latency threshold has not been reached, the reconciliation may periodically contact the reconciliation application 146 of the archive 140 and issue further retry queries for the unconfirmed message until the maximum latency threshold is reached.

In other embodiments, when a negative response for a retry query is received for a Gen-3 message, the reconciliation agent 127 may determine whether a maximum number of retry attempts has been reached. If the maximum number of retry attempts has not been reached, the reconciliation may periodically contact the reconciliation application 146 of the archive 140 and issue further retry queries for the unconfirmed message until the maximum number of attempts is reached.

When a message cannot be confirmed, the reconciliation agent 127 may perform remediation of the unconfirmed message by resubmitting the unconfirmed message to the archive 140. In some embodiments, the reconciliation agent 127 may perform remediation of the unconfirmed message when the maximum latency or maximum number of retry attempts has been reached. In other embodiments, there may be no maximum latency or maximum number of retry attempts, and the reconciliation agent 127 may begin remediation upon the failure of a single retry attempt. For example, if the first retry attempt for a Gen-3 message fails, the reconciliation agent 127 may being remediation for the message immediately upon receiving a negative response from the archive 140.

Until it is confirmed that a particular message is archived, the unconfirmed message remains in the message storage 310 to guarantee its availability. According to various embodiments, the reconciliation agent 127 may resubmit the unconfirmed message to the archive 140 and keep a copy of the unconfirmed message in the message storage 310. After the unconfirmed message is resubmitted to the archive 140, the reconciliation process may begin again until it is confirmed that the particular message is archived.

If a particular message cannot be reconciled after several resubmission attempts, intervention may be needed. According to various embodiments, upon the failure of remediation such as the failure of a certain number of resubmission attempts, the reconciliation agent 127 may generate and send an alert. For example, if reconciliation fails after several resubmission attempts, an alert may be sent to an administrator of the generating e-mail system informing the administrator of the problem and that some manual process is needed to resolve the problem. It can be appreciated that even when a particular message cannot be reconciled, the message remains in the message storage 310 to guarantee its availability.

Figure 5:
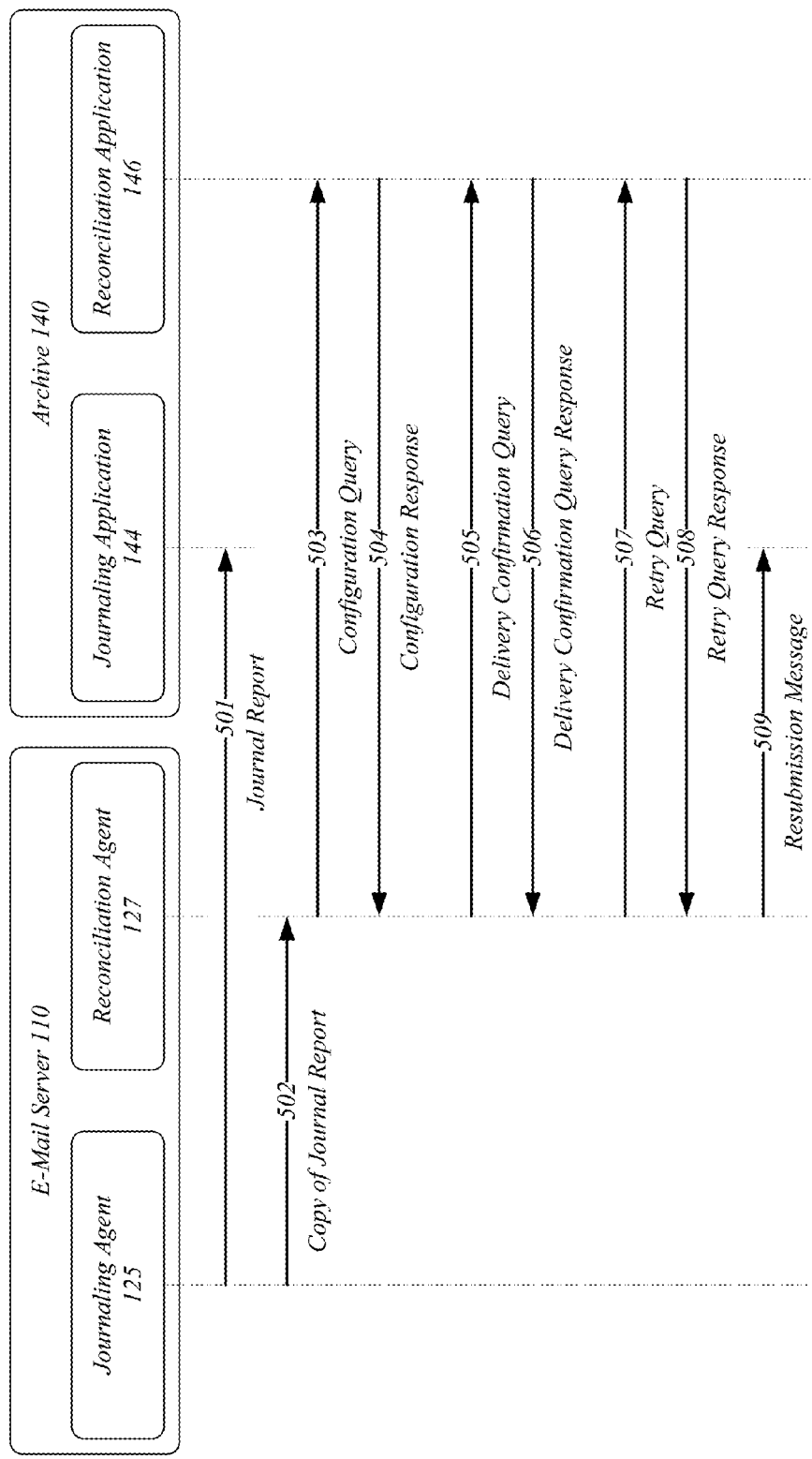
FIG. 5 illustrates an embodiment of a message flow.

FIG. 5 illustrates one embodiment of a message flow 500 suitable for practicing the various embodiments. As shown, the message flow 500 may involve the exchange of messages 501-509 between an e-mail server 110 and an archive 140. In some implementations, the messages 501-509 are sent and received by the journaling agent 125, the reconciliation agent 127, the journaling application 144, and the reconciliation application 146, as described above. The embodiments, however, are not limited to such implementations. Furthermore, while the example illustrated in FIG. 5 includes a particular set of messages, it can be appreciated that the message flow 500 provides an exemplary implementation of the general functionality. It is to be understood that alternative or additional messages may be included and that some messages may be omitted depending on the particular implementation.

As shown, the e-mail server 110, via the journaling agent 125, sends a journal report 501 to the archive 140. In various implementations, the journal report 501 may be created based on a set of journaling conditions. For example, when an e-mail message is sent to a recipient by the e-mail server 110, the journaling agent 125 may determine whether the e-mail message satisfies the conditions for journaling. If the conditions are met and journaling is to be applied, the journaling agent 125 packages the e-mail message as a journal report 501.

The journal report 501 may comprise, for example, a copy of the e-mail message that has met the journaling conditions for the archive 140 and metadata including a message ID for the message, the identities of the recipients, and other transport data for the message. The e-mail server 110 sends the e-mail message to the recipient and sends the journal report 501 via the journaling agent 125 to the archive 140. The journal report 501 may be sent to the archive 140 over e-mail through SMTP, for example.

According to various embodiments, when the journal report 501 is created, the journaling agent 125 also sends a copy of the journal report 502 to the reconciliation agent 127 for storage in a local mailbox or holding area, such as message storage 310. The copy of the journal report 502 includes the message to be reconciled which may comprise a copy of the same message sent to the recipient and sent to the archive 140. The copy of the journal report 502 also may comprise metadata including a message ID for the message, the identities of the recipients, and other transport data for the message.

As described above, in some implementations, messages pending reconciliation in the holding area may be categorized into multiple reconciliation generations. According to various embodiments, messages pending reconciliation may be categorized based on latency associated with the archive 140, when a copy of the message to be reconciled may be locally available from the cache 320, the failure to confirm the archiving of the message, a time interval for resolving message delays, or in other ways. In such implementations, queries may be issued according to message categorization to optimize the performance of the reconciliation process and minimize the number of queries to the archive 140.

In the example illustrated in FIG. 5, the reconciliation agent 127 may contact the reconciliation application 146 of the archive 140 and send a configuration query 503. In various implementations, the configuration query 503 may comprise a web service query requesting certain configuration information from the archive 140 such as the expected SLA or latency for processing messages. The configuration query 503 may be received by the archive 140 via the reconciliation application 146. The archive 140 responds to the configuration query 503 via the reconciliation application 146 with a configuration response 504 comprising the requested configuration information.

As shown, the e-mail server 110, via the reconciliation agent 127, may issue one or more queries to the reconciliation application 146 to guarantee the arrival and storage of a particular message at the archive 140. In various embodiments, the reconciliation agent 127 may perform an asynchronous reconciliation process for contacting the archive 140, inquiring whether the messages that were sent to the archive 140 have been fully saved, and confirming the storage of the messages in the archive 140. If the archive 140 cannot confirm the storage for a given message, the reconciliation agent 127 may perform a series of steps to ask the archive 140 again at a later point in time. Even if the archive 140 never confirms storage, the reconciliation agent 127 will maintain a local copy of the message which is available for viewing, printing, saving, and so forth.

In the example illustrated in FIG. 5, the reconciliation agent 127 may contact the reconciliation application 146 of the archive 140 and send a delivery confirmation query 505. In various implementations, the delivery confirmation query 505 may be sent during the time interval T1 after the expiration of $\Delta SLA$. The delivery confirmation query 505 may comprise, for example, the message IDs for one or more Gen-1 messages. Messages received by the reconciliation agent 127 and categorized as Gen-1 may correspond to messages expected to be stored in the archive 140. In addition, a copy of the message may be available from the cache 320 to realize I/O savings.

The delivery confirmation query 505 may be received by the archive 140 via the reconciliation application 146, and a determination may be made whether each of the messages identified in the delivery confirmation query 505 has been received and is fully stored by the archive 140. Based on the determination, the archive 140 responds to the delivery confirmation query 505 via the reconciliation application 146 with a delivery confirmation query response 506. In various implementations, the delivery confirmation query response 506 may be sent during the time interval T1 and comprise the message IDs for one or more Gen-1 messages.

If it is determined that all of the messages indentified in the delivery confirmation query 505 are fully stored, the archive 140 may respond via the reconciliation application 146 with a delivery confirmation query response 506 comprising a positive response (Ack) indicating that each message is stored. When the delivery confirmation query response 506 comprises a positive response, the reconciliation agent 127 confirms that the message is archived and may delete the message from the local message store 310.

If it is determined that one or more of the messages indentified in the delivery confirmation query 505 are not stored by the archive 140, the archive 140 may respond via the reconciliation application 146 with a delivery confirmation query response 506 comprising a negative response (Nak) identifying the messages that are not stored. When the reconciliation agent 127 receives a delivery confirmation query response 506 comprising a negative response, the unconfirmed messages are maintained in the message storage 310 to guarantee availability until it can be confirmed that the messages are archived.

When one or more messages are unconfirmed, the reconciliation agent 127 may contact the reconciliation application 146 of the archive 140 and send a retry query 507. In various implementations, the retry query 507 may be sent during the time interval T3 after allowing the time interval $\Delta IssueResolution$ to elapse for mail delays to be resolved. The retry query 507 may comprise the message IDs for one or more Gen-3 messages. Pending messages categorized as Gen-3 by the reconciliation agent 127 may correspond to unconfirmed messages that had delay issues that now may be resolved.

The retry query 507 may be received by the archive 140 via the reconciliation application 146, and a determination may be made whether each of the messages identified in the retry query 507 has been received and is fully stored by the archive 140. Based on the determination, the archive 140 responds to the retry query 507 via the reconciliation application 146 with a retry query response 508. In various implementations, the retry response 508 may be sent during the time interval T3 and comprise the message IDs for one or more Gen-3 messages.

If it is determined that all of the messages indentified in the retry query 507 are fully stored, the archive 140 may respond via the reconciliation application 146 with a delivery confirmation query response 508 comprising a positive response (Ack) indicating that each message is stored. When the retry query response 508 comprises a positive response, the reconciliation agent 127 confirms that the message is archived and may delete the message from the local message store 310.

If it is determined that one or more of the messages indentified in the retry query 507 are not stored by the archive 140, the archive 140 may respond via the reconciliation application 146 with a retry query response 508 comprising a negative response (Nak) identifying the messages that are not stored. When the reconciliation agent 127 receives a retry query response 508 comprising a negative response, the unconfirmed messages are maintained in the message storage 310 to guarantee availability until it can be confirmed that the messages are archived.

In some embodiments, when a retry query response 508 comprising a negative response is received, the reconciliation agent 127 may issue further retry queries until reaching a maximum latency threshold and/or a maximum number of attempts. In other embodiments, the reconciliation agent 127 may begin remediation immediately upon the failure of a single retry attempt.

When a message cannot be confirmed, the reconciliation agent 127 may perform remediation of the unconfirmed message by resubmitting the message to the archive 140. As shown, in some embodiments, the reconciliation agent 127 may perform remediation of the unconfirmed message by sending a resubmission message 509 to the journaling application 144. In other embodiments, the reconciliation agent 127 may perform remediation of the unconfirmed message by sending the resubmission message 509 to the journaling agent 125 for resubmission to the archive 140.

The resubmission message 509 may comprise a copy of the unconfirmed message and may be sent to the archive 140 as a journal report e-mail message through SMTP, for example. In various implementations, sending the resubmission message 509 replays the original journal report 501 sent to the archive 140. The reconciliation agent 127 also will keep a copy of the unconfirmed message in the message storage 310.

After the resubmission message 509 is sent, the reconciliation process may begin again until it is confirmed that the particular message is archived. If a particular message cannot be reconciled after several resubmission attempts, the reconciliation agent 127 may generate and send an alert to an administrator.

According to various embodiments, the message flow 500 may involve the exchange of one or more messages in accordance with a reconciliation protocol for communicating between the e-mail server 110 and the archive 140. The reconciliation protocol may be implemented, for example, as a web service using a web service protocol and web service schema. In some embodiments, the reconciliation protocol may be implemented to communicate XML documents in accordance with Simple Object Access Protocol (SOAP) communication protocol and procedures for communication between applications. When implemented as a web service, the reconciliation protocol may use various platform and language independent formats designed to communicate over computer networks such as the Internet in accordance with communications protocols such as HTTP, HTTPS, SMTP, FTP, and so forth. It can be appreciated that the reconciliation protocol may advantageously be implemented as a web service due to firewalls typically allowing HTTP traffic and many archives already providing an HTTP front-end to allow administrators to log in and perform searches on the archived content.

In some embodiments, the query and response messages of the reconciliation protocol may comprise web service queries and responses implemented as XML documents. The query and response XML documents may be implemented using XML schema and attributes such as XML namespaces (xmlns), XML schema instance (xsi), XML schema definition (xsd) extension filenames, and so forth. In some implementations, the query and response XML documents may comprise SOAP messages including a SOAP envelope and a SOAP body containing call and response information.

The following illustrates one non-limiting example of a configuration query 503 and a configuration response 504 implemented in accordance with a web service reconciliation protocol. In this example the configuration query 503 is asking to obtain certain configuration information, such as the expected SLA or latency for processing messages.

Query:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <Configuration xmlns="http://localhost/reconcile">
            <IgnoredParameter xmlns=""/>
        </Configuration>
    </soap:Body>
</soap:Envelope>
```

Response:
The SLA is "0 Years 0 Months 0 Days 0 Hours 10 Minutes 0 Seconds" Versions supported are 1.0 and 1.5

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <ConfigurationResponse xmlns="http://localhost/reconcile">
            <Configuration xmlns="">
                <Sla>P0Y0M0DT0H10M0S</Sla>
                <SupportedVersions>
                    <Version>
                        <MajorVersion>1</MajorVersion>
                        <MinorVersion>0</MinorVersion>
                    </Version>
                    <Version>
                        <MajorVersion>1</MajorVersion>
                        <MinorVersion>5</MinorVersion>
                    </Version>
                </SupportedVersions>
            </Configuration>
        </ConfigurationResponse>
    </soap:Body>
</soap:Envelope>
```

The following illustrates one non-limiting example of a delivery confirmation query 505 and a delivery confirmation response 506 implemented in accordance with a web service reconciliation protocol. In this example, the delivery confirmation query 505 is asking the archive account bank_customer@ehs.com for the status of two messages which were sent the times shown (the 'Z' suffix indicates UTC in XML schema).

Query:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <ConfirmDelivery xmlns="http://localhost/reconcile">
            <Account xmlns="">
                <EmailAddress>bank_customer@ehs.com</EmailAddress>
            </Account>
            <MessageIdList xmlns="">
                <MessageId SentTime="2008-09-01T09:00:00Z">12345@journal.report.messageid</MessageId>
                <MessageId SentTime="2008-09-01T09:01:00Z">67890@journal.report.messageid</MessageId>
            </MessageIdList>
        </ConfirmDelivery>
    </soap:Body>
</soap:Envelope>
```

Response:
The message latency was 9 Minutes and 15 seconds for the first message and 8 minutes and 12 seconds for the second message.

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <ConfirmDeliveryResponse xmlns="http://localhost/reconcile">
            <MessageIdList xmlns="">
                <MessageId Latency="P0Y0M0DT0H9M15S">12345@journal.report.messageid</MessageId>
                <MessageId Latency="P0Y0M0DT0H8M12S">67890@journal.report.messageid</MessageId>
            </MessageIdList>
        </ConfirmDeliveryResponse>
    </soap:Body>
</soap:Envelope>
```

It can be appreciated that while some embodiments may be described as implementing the reconciliation protocol in accordance with a web service protocol, other protocols may be used including, without limitation, a Remote Procedure Call (RPC) protocol, e-mail messaging protocols, Internets protocol such as Transmission Control Protocol (TCP), a Representational State Transfer (REST) protocol, web feed protocols such as Really Simple Syndication (RSS), and/or any other suitable synchronous or asynchronous protocols.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 6:
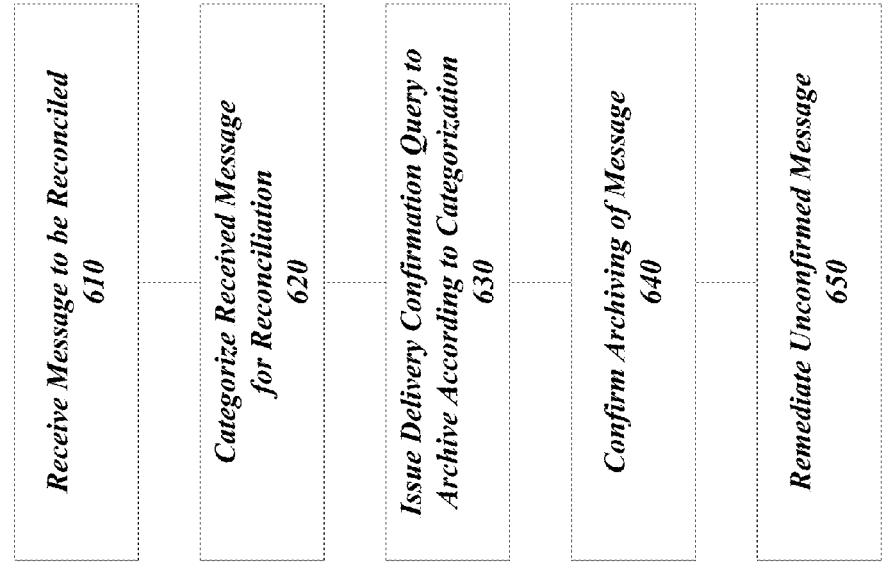
FIG. 6 illustrates an embodiment of a logic flow.

FIG. 6 illustrates one embodiment of a logic flow 600 suitable for practicing the various embodiments. The logic flow 600 may be representative of some or all of the operations executed by one or more embodiments described herein.

As shown, the logic flow 600 may comprise receiving a message to be reconciled (block 610). In various implementations, the message to be reconciled may correspond to a message sent by an e-mail server 110 to an archive 140 for storage. In some implementations, for example, the message to be reconciled may comprise a copy of a message sent to the archive 140 for storage. The message to be reconciled may be received in a copy of a journal report 502 corresponding to a journal report 501 sent by the e-mail server 110 to the archive 140. The copy of the journal report 502 may comprise a copy of the same message that was sent to a recipient and sent to the archive 140 for storage.

The logic flow 600 may comprise categorizing the received message for reconciliation (block 620). In various embodiments, the message to be reconciled may be categorized based on one more time intervals such as a time interval corresponding to latency associated with the archive 140, a time interval when a copy of the message to be reconciled is available in a local cache 320, and a time interval for resolving delay issues. The message to be reconciled also may be categorized based on receiving a negative response to a delivery confirmation query.

The logic flows 600 may comprise issuing a delivery confirmation query to the archive according to categorization of the message for reconciliation (block 630). In various embodiments, the delivery confirmation query may be delayed based on latency of the archive 140. In some implementations, the delivery confirmation query may be sent to the archive 140 in accordance with a web service protocol.

The logic flow 600 may comprise confirming the archiving of the message sent to the server (block 640). In various embodiments, the message to be reconciled is stored in a holding area, such as the message storage 310, until it is confirmed that the message sent to the archive 140 is stored. After confirming storage of the message at the archive 140, the message to be reconciled may be deleted from the message storage 310. If a negative response to the delivery confirmation query is received, a retry query may be sent to the archive 140 until a maximum latency and/or maximum number of attempts is reached.

The logic flow 600 may comprise remediating an unconfirmed message (block 650). In various embodiments, the message to be reconciled may be resubmitted to the archive after receiving a negative response to the retry query. After the unconfirmed message is resubmitted to the archive 140, the reconciliation process may begin again until it is confirmed that the particular message is archived. It can be appreciated that even when a particular message cannot be reconciled, the message remains in the message storage 310 to guarantee its availability.

It can be appreciated that while the logic flow 600 may illustrate a certain sequence of steps, other sequences of steps may also be performed according to alternative embodiments. Moreover, some individual steps of the logic flow 600 may include multiple sub-steps that may be performed in various sequences as appropriate to the individual step. Furthermore, additional steps may be added or some steps may be removed depending on the particular implementation.

FIG. 7 illustrates a diagram an article of manufacture 700 suitable for storing logic for the various embodiments. As shown, the article of manufacture 700 may comprise a storage medium 702 to store logic 704. Examples of the storage medium 702 may include one or more types of computer-readable storage media capable of storing electronic data, including volatile memory or non-volatile memory, removable or non-removable memory, erasable or non-erasable memory, writeable or re-writeable memory, and so forth. Examples of the logic 704 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 700 and/or the computer-readable storage medium 702 may store logic 704 comprising executable computer program instructions that, when executed by a computer, cause the computer to perform methods and/or operations in accordance with the described embodiments. Examples of a computer may include any suitable computing device having computing capabilities and/or communications capabilities in accordance with the described embodiments. Exemplary computing device may include, without limitation, a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof.

The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C#, C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    receiving a copy of a journal report corresponding to a journal report sent by a server to an archive, the copy of the journal report comprising a message to be reconciled corresponding to a message sent by the server to the archive for storage;
    categorizing, by a processor, the received message for reconciliation into one of a plurality of categories based on whether an amount of time that has elapsed since the copy of the journal report was received is within one or more time intervals, wherein a first category corresponds to a first time interval corresponding to at least one of delivery and processing latency associated with the archive and a second category corresponds to a second time interval corresponding to the time period after the expiration of the first time period and before the expiration of a local cache lifetime, wherein the copy of the message is stored in the local cache;
    issuing a delivery confirmation query to the archive according to categorization of the message for reconciliation, wherein a delivery confirmation query is not issued for at least one category and is issued for at least one other category; and
    determining whether the message sent from the server to the archive is stored at the archive based on a response to the delivery confirmation query.

2. The method of claim 1, comprising issuing a configuration query requesting configuration information from the archive including an expected latency.

3. The method of claim 1, wherein a third category corresponds to a third time interval corresponding to a time interval for resolving delay issues.

4. The method of claim 1, comprising categorizing the message to be reconciled based on receiving a negative response to the delivery confirmation query.

5. The method of claim 1, comprising issuing a retry query after receiving a negative response to the delivery confirmation query.

6. The method of claim 5, comprising resubmitting the message to be reconciled to the archive after receiving a negative response to the retry query.

7. The method of claim 1, comprising:
storing the message to be reconciled; and
deleting the message to be reconciled after receiving a positive response to the delivery confirmation query.

8. The method of claim 1, comprising issuing the delivery confirmation query to the archive in accordance with a web service protocol.

9. A computer-readable storage medium having computer-executable instructions stored thereon which, when executed by a computer, will cause the computer to:
receive a copy of a journal report corresponding to a journal report sent by a server to an archive, the copy of the journal report comprising a message to be reconciled corresponding to a message sent by the server to the archive for storage;
categorize the message to be reconciled into one of a plurality of categories based on whether an amount of time that has elapsed since the copy of the journal report was received is within one or more time intervals, wherein a first category corresponds to a first time interval corresponding to at least one of delivery and processing latency associated with the archive and a second category corresponds to a second time interval corresponding to the time period after the expiration of the first time period and before the expiration of a local cache lifetime, wherein the copy of the message is stored in the local cache;
issue a delivery confirmation query to the archive, wherein a delivery confirmation query is not issued for at least one category and is issued for at least one other category; and
confirm whether the message sent from the server to the archive is stored at the archive based on a response to the delivery confirmation query.

10. The computer-readable medium of claim 9, wherein a third time interval corresponding to a time interval for resolving delay issues.

11. The computer-readable medium of claim 9, further comprising computer-executable instructions stored thereon which, when executed by a computer, will cause the computer to issue a retry query after receiving a negative response to the delivery confirmation query.

12. The computer-readable medium of claim 11, further comprising computer-executable instructions stored thereon which, when executed by a computer, will cause the computer to resubmit the message to be reconciled to the archive after receiving a negative response to the retry query.

13. The computer-readable medium of claim 9, further comprising computer-executable instructions stored thereon which, when executed by a computer, will cause the computer to:
store the message to be reconciled; and
delete the message to be reconciled after receiving a positive response to the delivery confirmation query.

14. An apparatus, comprising:
a processing unit;
a message receiving component executing on the processing unit to receive a copy of a journal report from a journaling agent, the copy of the journal report comprising a message to be reconciled corresponding to a message sent by the journaling agent to an archive for storage;
a categorizing component executing on the processing unit to categorize the received message for reconciliation into one of a plurality of categories based on whether an amount of time that has elapsed since the copy of the journal report was received is within one or more time intervals, wherein a first category corresponds to a first time interval corresponding to at least one of delivery and processing latency associated with the archive and a second category corresponds to a second time interval correspond to the time period after the expiration of the first time period and before the expiration of a local cache lifetime, wherein the copy of the message is stored in the local cache; and
a query issuing component executing on the processing unit to issue a delivery confirmation query to the archive for determining whether the message sent from the server to the archive is stored at the archive, wherein a delivery confirmation query is not issued for at least one category and is issued for at least one other category.

15. The apparatus of claim 14, comprising:
a query response receiving component to receive a response to the delivery confirmation query from the archive, wherein the query issuing component issues a retry query after receiving a negative response to the delivery confirmation query; and
a remediation component to resubmit the message to be reconciled to the archive after receiving a negative response to the retry query.

16. The apparatus of claim 14, wherein apparatus comprises the journaling agent.

17. The apparatus of claim 14, wherein the delivery confirmation query comprises a web service query.

18. The method of claim 3, comprising issuing a delivery confirmation query for messages in the second category, and not issuing delivery confirmation queries for messages in the first and third categories.

19. The computer-readable medium of claim 10, further comprising computer-executable instructions stored thereon which, when executed by a computer, will cause the computer to issue a delivery confirmation query for messages in the second category, and not issue delivery confirmation queries for messages in the first and third categories.

20. The apparatus of claim 14, the plurality of categories comprising a third category corresponding to a third time interval corresponding to a time interval for resolving delay issues; and the query issuing component to issue a delivery confirmation query for messages in the second category, and not issue delivery confirmation queries for messages in the first and third categories.

* * * * *